(12) United States Patent
Chung et al.

(10) Patent No.: US 7,537,237 B2
(45) Date of Patent: May 26, 2009

(54) DETACHABLE WHEELCHAIR

(75) Inventors: Tien-Tung Chung, Taipei (TW);
Yun-Chin Su, Hsin Chuang (TW);
Chun-Shuo Huang, Sinjhuang (TW)

(73) Assignee: Pro-Glory Enterprise Co., Ltd. (TW)

( * ) Notice: Subject to any disclaimer, the term of this patent is extended or adjusted under 35 U.S.C. 154(b) by 324 days.

(21) Appl. No.: 11/425,676

(22) Filed: Jun. 21, 2006

(65) Prior Publication Data
US 2007/0164539 A1    Jul. 19, 2007

(30) Foreign Application Priority Data
Jan. 18, 2006    (TW) ............... 95201138 U

(51) Int. Cl.
*B62B 3/02* (2006.01)
(52) U.S. Cl. .............. 280/647; 280/643; 280/47.38
(58) Field of Classification Search ........... 280/642, 280/643, 647, 648, 650, 47.25, 47.38, 47.39, 280/47.4, 47.41
See application file for complete search history.

(56) References Cited

U.S. PATENT DOCUMENTS

| 4,170,368 | A | * | 10/1979 | Southward et al. ....... 280/250.1 |
| 4,405,142 | A | | 9/1983 | Whestine |
| 4,542,918 | A | * | 9/1985 | Singleton .................... 280/650 |
| 4,595,212 | A | | 6/1986 | Haury et al. |
| 5,156,226 | A | * | 10/1992 | Boyer et al. ............... 180/65.1 |
| 5,176,393 | A | * | 1/1993 | Robertson et al. ........ 280/250.1 |
| 5,207,549 | A | | 5/1993 | Riva |
| 5,240,276 | A | * | 8/1993 | Coombs .................... 280/647 |
| 5,267,745 | A | | 12/1993 | Robertson et al. |
| 5,409,247 | A | | 4/1995 | Robertson et al. |
| 5,466,111 | A | | 11/1995 | Meyer |
| 5,727,809 | A | | 3/1998 | Ordelman et al. |
| 6,416,272 | B1 | | 7/2002 | Suehiro et al. |
| 6,419,260 | B1 | * | 7/2002 | Kuroda ....................... 280/647 |
| 6,494,475 | B2 | | 12/2002 | Rossi et al. |
| 6,572,133 | B1 | | 6/2003 | Stevens |
| 6,582,181 | B2 | | 6/2003 | Suehiro et al. |
| 6,769,705 | B1 | * | 8/2004 | Schlangen ............... 280/250.1 |
| 6,962,383 | B2 | | 11/2005 | Takenoshita et al. |
| 7,128,332 | B2 | * | 10/2006 | Hermes et al. .............. 280/647 |

(Continued)

FOREIGN PATENT DOCUMENTS

JP    2003339773    12/2003

(Continued)

*Primary Examiner*—Christopher P Ellis
*Assistant Examiner*—John D. Walters
(74) *Attorney, Agent, or Firm*—Wells St. John P.S.

(57) ABSTRACT

A detachable wheelchair for the disabled people is provided. The wheelchair is composed of a seat, a right wheel frame, and a left wheel frame. The seat is composed of a seat frame and a seat cushion. Two hollow shafts and one fixing nut are installed on the left-hand and right-hand side of the seat frame respectively. Two positioning shafts and one fixing bolt are arranged on the right and left wheel frame respectively. The positioning shafts on the wheel frames can be inserted into the hollow shafts on the seat frame, and the bolts can be screwed into the nuts. After the left and right wheel frames are fixed firmly onto the seat frame, they are assembled into a wheelchair.

4 Claims, 11 Drawing Sheets

U.S. PATENT DOCUMENTS

2005/0077760 A1* 4/2005 Smith .......................... 297/42
2008/0133089 A1* 6/2008 Bayomy et al. ............... 701/49

FOREIGN PATENT DOCUMENTS

| JP | 2004148093 | 5/2004 |
| JP | 2004236748 | 8/2004 |
| JP | 2005034325 | 2/2005 |
| JP | 2005034326 | 2/2005 |
| JP | 2005034327 | 2/2005 |
| JP | 2005034328 | 2/2005 |
| JP | 2004098845 | 6/2006 |

* cited by examiner

DETACHABLE WHEELCHAIR

CROSS-REFERENCES TO RELATED APPLICATIONS

This application claims priority to Taiwan Patent Application No. 095201138 filed on Jan. 18, 2006.

BACKGROUND OF THE INVENTION

1. Field of the Invention

The present invention relates to a detachable wheelchair for disabled people; specifically to a detachable wheelchair wherein a right wheel frame and a left wheel frame are able to be detachable from a seat thereof so the seat is able to shift into a vehicle to improve the inconvenient movement for the disabled people between the wheelchair and the seat.

2. Descriptions of the Related Art

As to the disabled or the aged people, the wheelchair is one choice among transportation vehicles in their daily lives. Quite a few papers have been disclosed according to the wheelchair at many countries, and furthermore, final products therefor have also been provided to those people to facilitate their extra activities.

U.S. Pat. No. 4,405,142 provides a knock down wheel chair that can be assembled together by a front frame, a back frame and left and right side frames by means of quick release pins. The main wheels of the wheel chair are adjustable by means of a plurality of axle mounting bores on left and right wheel brackets.

U.S. Pat. No. 4,595,212 provides a sports wheelchair which includes a tubular member. The main structure thereof is divided into left and right frame portions which are connected with a folding mechanism to enable the left and right side frame portions to be folded together for easier transportation and storage.

U.S. Pat. Nos. 5,267,745 and 5,409,247 provide a wheelchair which is defined by a seat flat connected with a pair of side frame assemblies that comprises a plurality of holes for adjusting the inclined angles of the rear wheel and the seat flat.

U.S. Pat. No. 5,727,809 provides a collapsible wheelchair having a left side frame, a right side frame, consisted of two pieces of boards. The wheelchair uses a rotational manner to collapse the mechanism thereof for the purpose of saving the space.

U.S. Pat. No. 6,572,133 provides a complex design to a collapsible mechanism of a wheelchair to enhance its stability and safety.

For the sake of providing the user a more comfortable operation condition, U.S. Pat. No. 6,494,475 provides an assembling method of a wheel frame to a wheelchair so that the wheel frame is able to be assembled into the wheelchair at different height levels and using tubular materials with different diameters.

So as to the connection of the mechanism of a wheelchair and a car seat, U.S. Pat. No. 5,207,549 provides a design for a seat which is able to be slided so that the user of the wheelchair can use a sliding mechanism to slide the wheelchair directly into a car to act as a car seat.

U.S. Pat. No. 5,466,111 provides a wheelchair which uses a revolving axle to connect with a car door and utilizes a movement of opening or closing the car door to shift the wheelchair into or out of the car.

U.S. Pat. Nos. 6,416,272 and 6,582,181 provides a welfare mechanism in a wheelchair system which uses a pair of four-link mechanism to act as a lift-up mechanism of a seat. A connecting recess with a special design in the rear side of the seat unit connects with the four-link mechanism. After the wheel below the seat unit uses another driving force to retract to an invisible position, the four-link mechanism can lift up the wheelchair and move it directly into a car so that the wheelchair can be used as a car seat.

U.S. Pat. No. 6,962,383 provides a wheelchair and a similar method as described of the above-mentioned to move the wheelchair into a car by using a lift-up mechanism and a specific track is also used disposed on a board of the car to move the wheelchair back and forth therein.

A wheelchair disclosed in Japanese Patent No. 2003-339773 use a platform which is able to be retracted into a car to be a car seat, wherein the platform is divided into three sectional structures. The middle section uses a four-link mechanism to maintain the stability of the seat during up or down. When the seat is removed out of the car chamber, a movement of going down will be executed owing to its weight and the track of moving down will be decided according to the shape of the four-link mechanism.

Japanese Patent No. 2004-148093 and Japanese Patent No. 2004-236748 provides an accommodating method and a mechanism for a wheel below a wheelchair when the wheelchair is moved directly into a car to be used as a car seat.

According to the mechanisms for both wheels and a seat, Japanese Patent Nos. 2005-34325~2005-34328 provide an accommodating mechanism for front and rear wheels, a seat mechanism for shifting out, a seat fixing mechanism so that the handicapped people can use as a safety transportation vehicle.

A wheelchair disclosed in Japanese Patent No. 2004-98845 can be divided into an upper portion, a seat portion, and a lower portion, a wheel frame. A revolving platform in the car chamber can be used to revolve the seat facing the car door and then the seat can be removed out of the car by tracks directly and can be combined with the wheel frame to form a wheelchair. As disassembling the wheelchair, the seat portion can be separated from the wheel frame by means of the tracks directly and then it can slide directly into the tracks on the bottom board of the welfare car. Therefore, the purpose of the transformation between the wheelchair and the welfare seat can be achieved. However, the left and the right wheels of the wheel frame are not separated apart so as the wheel frame is moved into the car, the space therein will be occupied more. Moreover, the design of the seat sliding between the wheel frame and the bottom board will shift the center of gravity as the car is moving and accordingly lead to a dangerous situation about track misalignment.

The prior art of the above-mentioned fails to meet the requirement of disassembling the left and the right wheel frame quickly in order to move it into a welfare vehicle as a welfare seat. Therefore, it is essential to promote the function of the prior wheelchair for the disabled people to become a convenient transportation vehicle.

SUMMARY OF THE INVENTION

An object of the present invention is to provide a detachable wheelchair for the disabled people which comprises a seat, a right wheel frame, and a left wheel frame. While assembling, positioning shafts of two sides of the wheel frames are used to be inserted into hollow shafts of two sides of the seat frame. Fixing bolts of the wheel frames are screwed into the fixing nuts of the two sides of the seat frame so that these three portions can be assembled together as a unique wheelchair. A plurality of linkage pins configured at two sides behind the seat frame can be inserted into a lifting mechanism of the vehicle, for example, a welfare car, to perform a lifting or descending movement.

Another object of this invention is to provide a detachable wheelchair with a quick detaching function. The wheelchair is able to be also assembled with a lifting mechanism disposed on a vehicle, such as a welfare car. As a right wheel frame and a left wheel frame are assembled with a seat frame by means of fixing bolts and nuts, a unique wheelchair can be formed for the disabled people. As the disabled people wish to remove the wheelchair into a welfare vehicle, the lifting mechanism is first to be driven so that linkage pins on the seat frame can be inserted into the corresponding linkage recesses. Then, after the lifting mechanism lifts the wheelchair off the ground a little bit, the fixing bolts are able to be loosened from the seat frame that the left and the right wheel frame can be separated from the seat frame. Next, the lifting mechanism can shift the seat into the vehicle that the wheelchair of the present invention will be used as a seat in the vehicle. For the reason that the left and the right wheel frames can be detachable separately, after the present invention is converted into the seat inside the vehicle, the space required for containing the wheel frames correspondingly diminishes. The inconvenience for transforming the wheelchair outside the vehicle into the seat inside the vehicle for the passenger is thus avoided.

Yet a further object of this invention is to provide a seat, able to be assembled into a wheelchair quickly, comprises a seat cushion and a seat frame. The seat cushion is disposed upon the seat frame while the seat frame comprises a central fixing module and a linkage pin assembly that the central fixing module is able to be assembled with a right wheel frame and a left wheel frame in a detachable manner to become the wheelchair which is able to be independently operated. Moreover, a lifting mechanism is connected to the linkage pin assembly whereby the seat is able to be shifted into a vehicle or to be removed from the vehicle after the right wheel frame and the left wheel frame are detached from the central fixing module, or on the contrary, the right wheel frame and the left wheel frame are able to be assembled to the seat quickly after the seat is removed out of the vehicle. Therefore, the purpose of converting a wheelchair outside a vehicle into a seat therein can be easily achieved; hence, the function and the convenience of the wheelchair can be enhanced sufficiently.

DESCRIPTION OF THE PREFERRED EMBODIMENT

Figure 1:
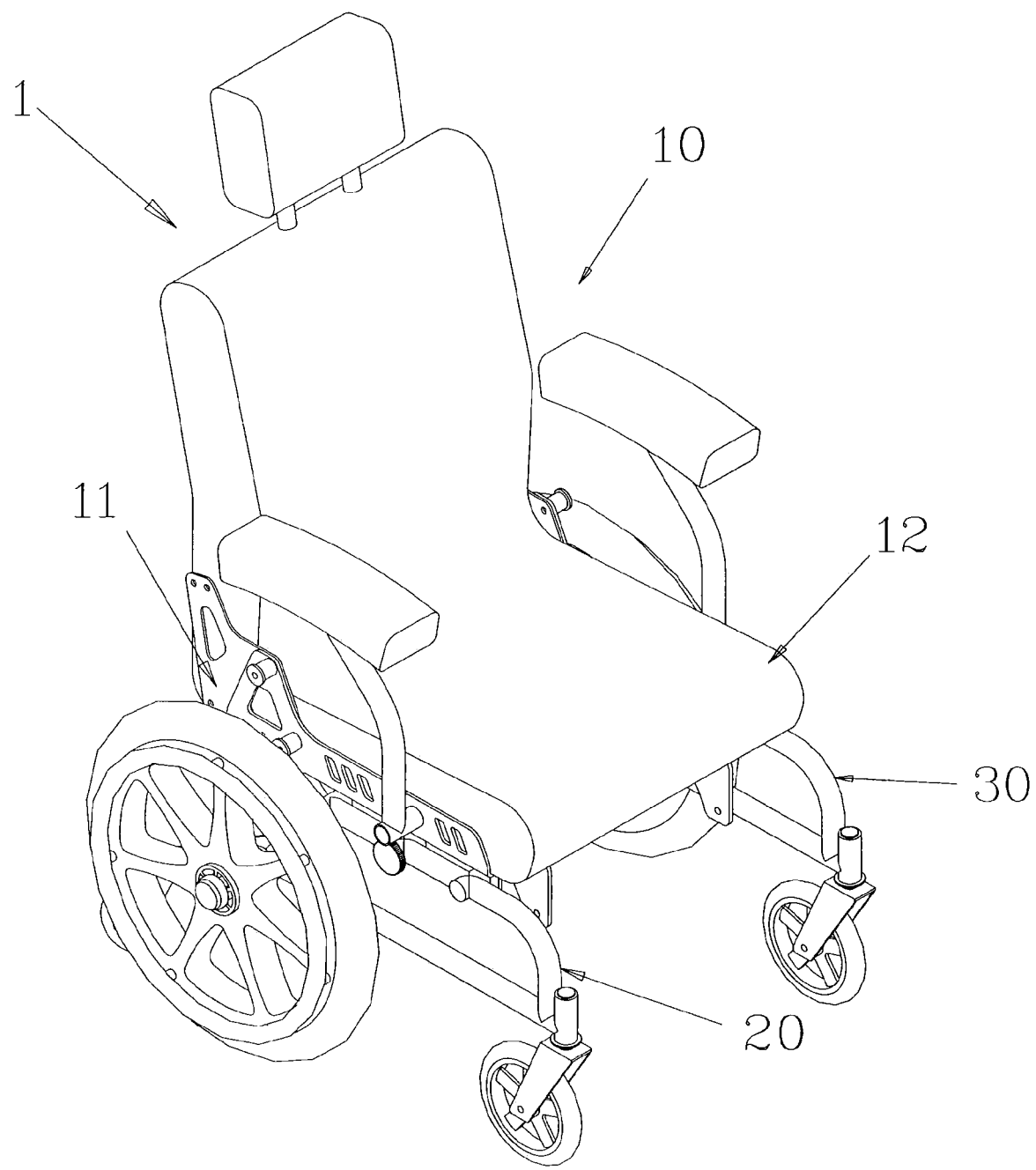
FIG. 1 illustrates a combination diagram of the present invention.
Figure 2:
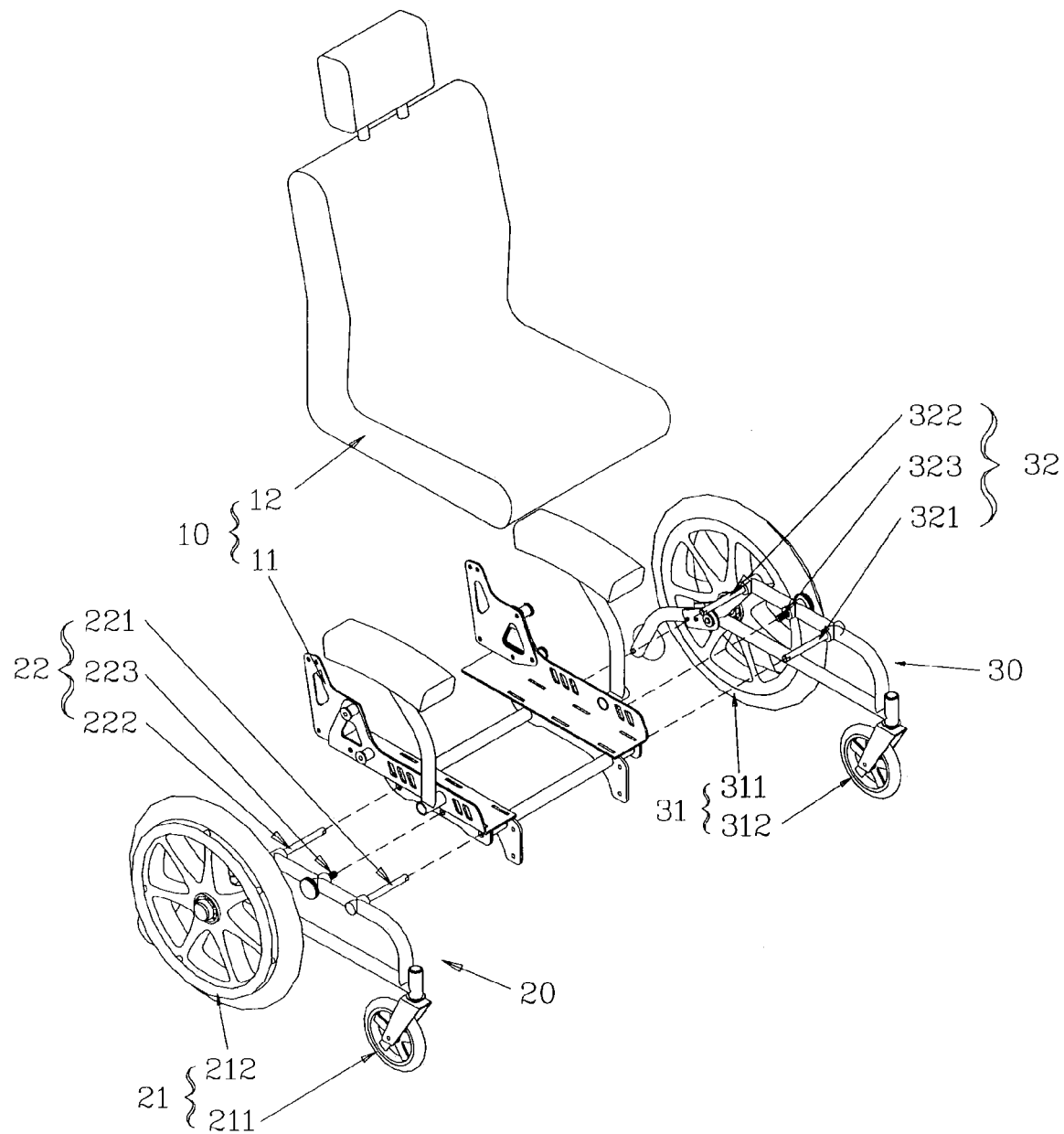
FIG. 2 illustrates a decomposition diagram of the present invention.

FIG. 1 is a combination diagram of the present invention. FIG. 2 is a decomposition diagram of the present invention. The detachable wheelchair 1 of the invention comprises three main portions, a seat 10, a right wheel frame 20 and a left wheel frame 30. The seat 10 is disposed in a central position of the wheelchair and comprises a seat frame 11 and a seat cushion 12 which is disposed upon the seat frame 11.

Next, the right wheel frame 20, disposed at the right handside of the seat frame 11, comprises a right wheel assembly 21 and a detachable right fixing module 22, pivoting on said right wheel frame 20 respectively. The right wheel assembly 21 comprises a right front wheel 211 and a right rear wheel 212, respectively arranged at the front end and the rear end below the right wheel frame 20. Moreover, the detachable right fixing module 22 comprises two right positioning shafts 221, 222 and one right fixing bolt 223. Specifically, the front positioning shaft 221, the rear positioning shaft 222 and the right fixing bolt 223 are disposed on an upper side of the right wheel frame 20 while the right fixing bolt 223 is disposed between the positioning shafts 221, 222.

The left wheel frame 30 is disposed at the left-hand side of the seat frame 11 and symmetric with the right wheel frame 20. The left wheel frame 30 comprises a left wheel assembly 31 and a detachable left fixing module 32, pivoting on said left wheel frame 30 respectively. The left wheel assembly 31 comprises a left front wheel 311 and a left rear wheel 312, respectively arranged at the front end and the rear end below the left wheel frame 30. Moreover, the detachable left fixing module 32 comprises two left positioning shafts 321, 322 and one left fixing bolt 323. Specifically, the front positioning shaft 321, the rear positioning shaft 322 and the left fixing bolt 323 are disposed on an upper side of the left wheel frame 30 while the left fixing bolt 323 is disposed between the positioning shafts 321, 322.

Figure 3:
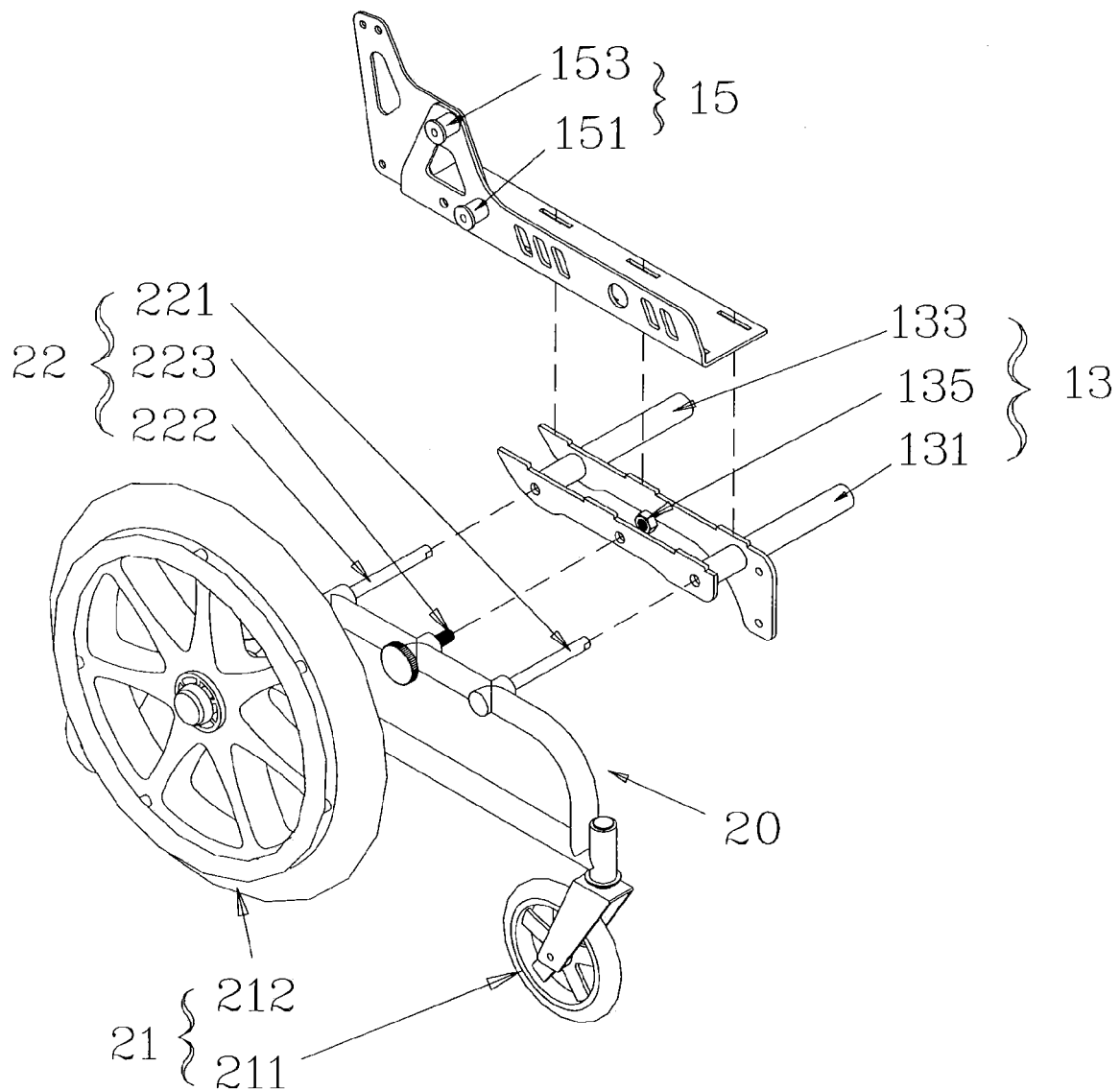
FIG. 3 illustrates a diagram of the configuration of the right wheel frame and the seat frame of the present invention.

FIG. 3 is a diagram illustrating the configuration of the right wheel frame 20 and the seat frame 11 of the present invention while the seat frame 11 further comprises a central fixing module 13. In this diagram, only the right-hand side of the central fixing module 13 of the seat frame 11 is shown. A front hollow shaft 131, a rear hollow shaft 133, and a fixing nut 135 are configured at the right-hand side of the central fixing module 13 of the seat frame 11, while the front hollow shaft 131 and the rear hollow shaft 133 are configured corresponding to the positioning shafts 221, 222 of the right wheel frame 20. The fixing nut 135, disposed at the position between the front and the rear hollow shafts 131, 133, is configured corresponding to the fixing bolt 223 of the right wheel frame 20. Moreover, a linkage pin assembly 15 is configured at the seat frame while the linkage pin assembly 15 comprises a front linkage pin 151 and a rear linkage pin 153 disposed at the right-hand and rear side of the seat frame 15. The linkage pin assembly 15 uses the front and the rear linkage pins 151, 153 configured corresponding to a specific recess of a lifting mechanism so that the wheelchair 1 is able to connect to other device for lifting the wheelchair 1.

Figure 4:
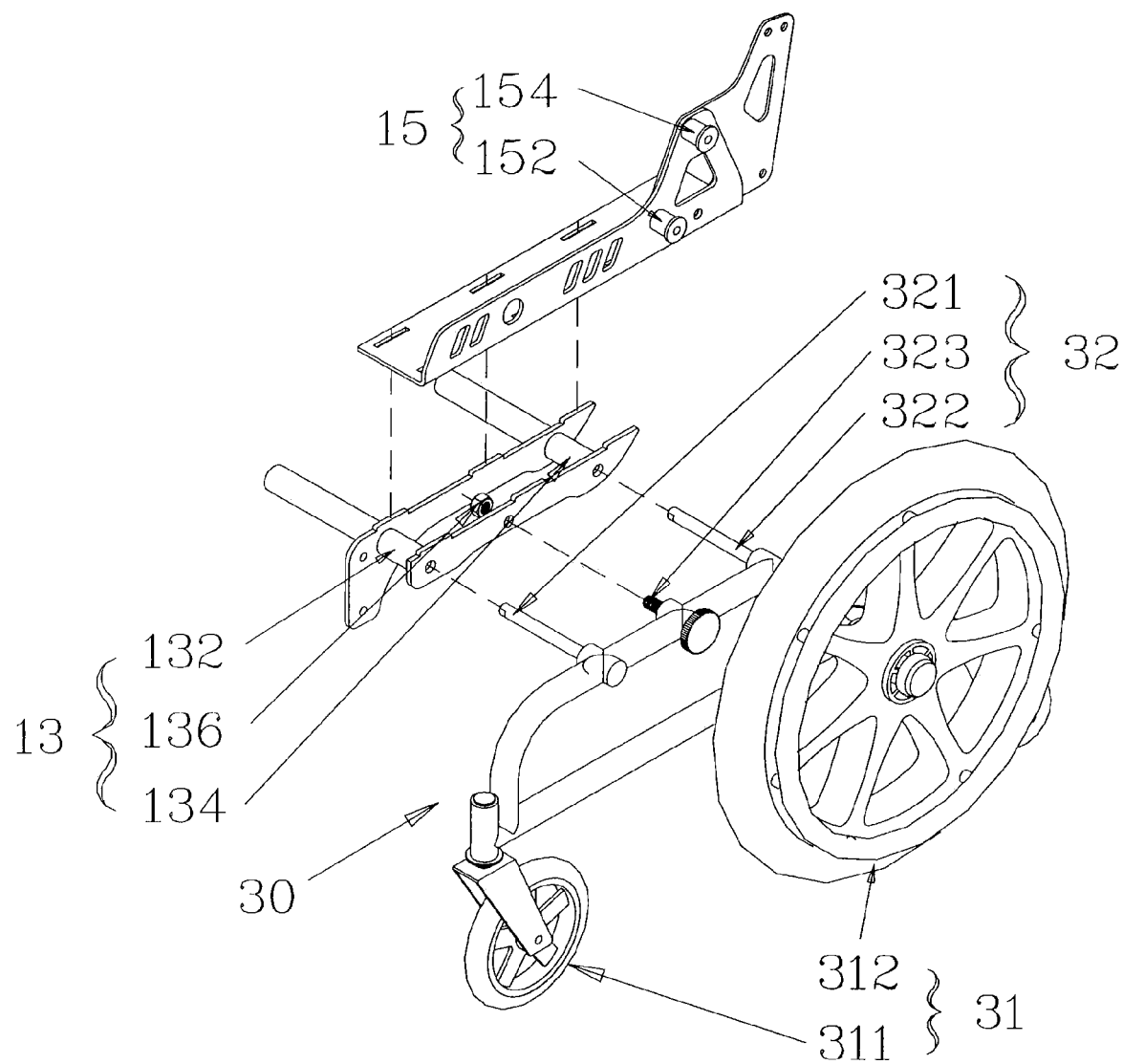
FIG. 4 illustrates a diagram of the configuration of the left wheel frame and the seat frame of the present invention.

FIG. 4 is a diagram illustrating the configuration of the left wheel frame 30 and the seat frame 11 of the present invention.

In this diagram, only the left-hand side of the central fixing module 13 of the seat frame 11 is shown. A front hollow shaft 132, a rear hollow shaft 134, and a fixing nut 136 are configured at the left-hand side of the central fixing module 13 of the seat frame 11, while the front hollow shaft 132 and the rear hollow shaft 134 are configured corresponding to the positioning shafts 321, 322 of the left wheel frame 30. The fixing nut 136, disposed at the position between the front and the rear hollow shafts 132, 134, is configured corresponding to the fixing bolt 323 of the left wheel frame 30. Moreover, the linkage pin assembly 15 comprises a front linkage pin 152 and a rear linkage pin 154 disposed at the left-hand and rear side of the seat frame 15. The linkage pin assembly 15 uses the front and the rear linkage pins 152, 154 configured corresponding to a specific recess of a lifting mechanism so that the wheelchair 1 is able to connect to other device for lifting the wheelchair 1.

Figure 5:
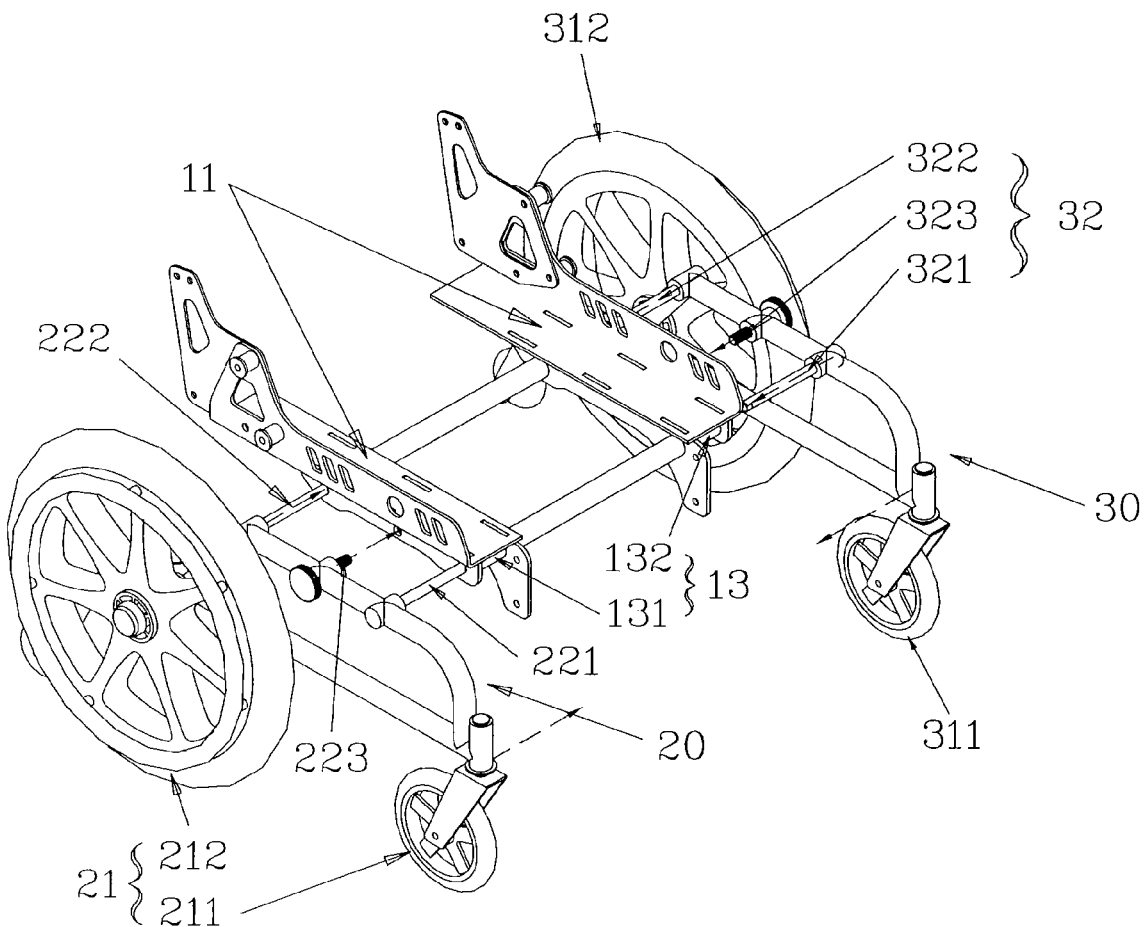
FIG. 5 illustrates a diagram of the assembly of the seat frame, the right and the left wheel frame of the present invention

FIG. 5 is a diagram illustrating the assembly of the seat frame 11, the right and the left wheel frame 20, 30 of the present invention. While assembling, the front and the rear positioning shafts 221, 222 of the right wheel frame 20 are inserted into the front and the rear hollow shafts 131, 133 on the right-hand side of the seat frame 11, and then, the fixing bolt 223 of the right wheel frame 20 is screwed into the fixing nut 135 of the right-hand side of the seat frame 11. Accordingly, the right wheel frame 20 is able to be fixed to the right-hand side of the seat frame 11. Next, the front and the rear positioning shafts 321, 322 of the left wheel frame 30 are inserted into the front and the rear hollow shafts 132, 134 on the left-hand side of the seat frame 11, and then, the fixing bolt 323 of the left wheel frame 30 is screwed into the fixing nut 136 of the left-hand side of the seat frame 11. Accordingly, the left wheel frame 30 is able to be fixed to the right-hand side of the seat frame 11. Therefore, the sear frame 11, the right wheel frame 20, and the left wheel frame 30 together form a main and integrated structure of a wheelchair. By means of right, front wheel 211, right rear wheel 212, left front wheel 311, and left rear wheel 312, the wheelchair can hold the weight thereon. With the seat cushion 12 added, a unique wheelchair can be provide to a disabled people to use.

To sum up, one of the characteristic of the present invention is that the left and right detachable fixing modules 22, 32 of the left and the right wheel frames 20, 30 are able to be fixed to the central fixing module 13, or on the contrary, be detachable therefrom. That is, the seat 10, the right wheel frame 20, and the left wheel frame 30 are able to be assembled into a unique wheelchair for the disabled people by means of the positioning shafts 221, 222, 321, 322 and the fixing bolts 223, 323.

Please refer to FIG. 2, the present invention also provide a seat 10 which can be assembled quickly to be a wheelchair 1. The seat 10 comprises a seat frame 11 and a seat cushion 12 while the seat cushion 12 is disposed upon the seat frame 11 and the seat frame further comprises a central fixing module 13 and a linkage pin assembly 15. The central fixing module 13 and a linkage pin assembly 15 are similar with the above-mentioned which can be assembled with a right wheel frame 20 and a left wheel frame 30 to become a unique wheelchair 1 to be operated independently. Moreover, it could also be connected to other devices, such as a lifting mechanism, for lifting the seat. Therefore, the purpose of converting a wheelchair outside a vehicle into a seat therein can be easily achieved; hence, the function and the convenience of the wheelchair can be enhanced sufficiently.

Figure 6:
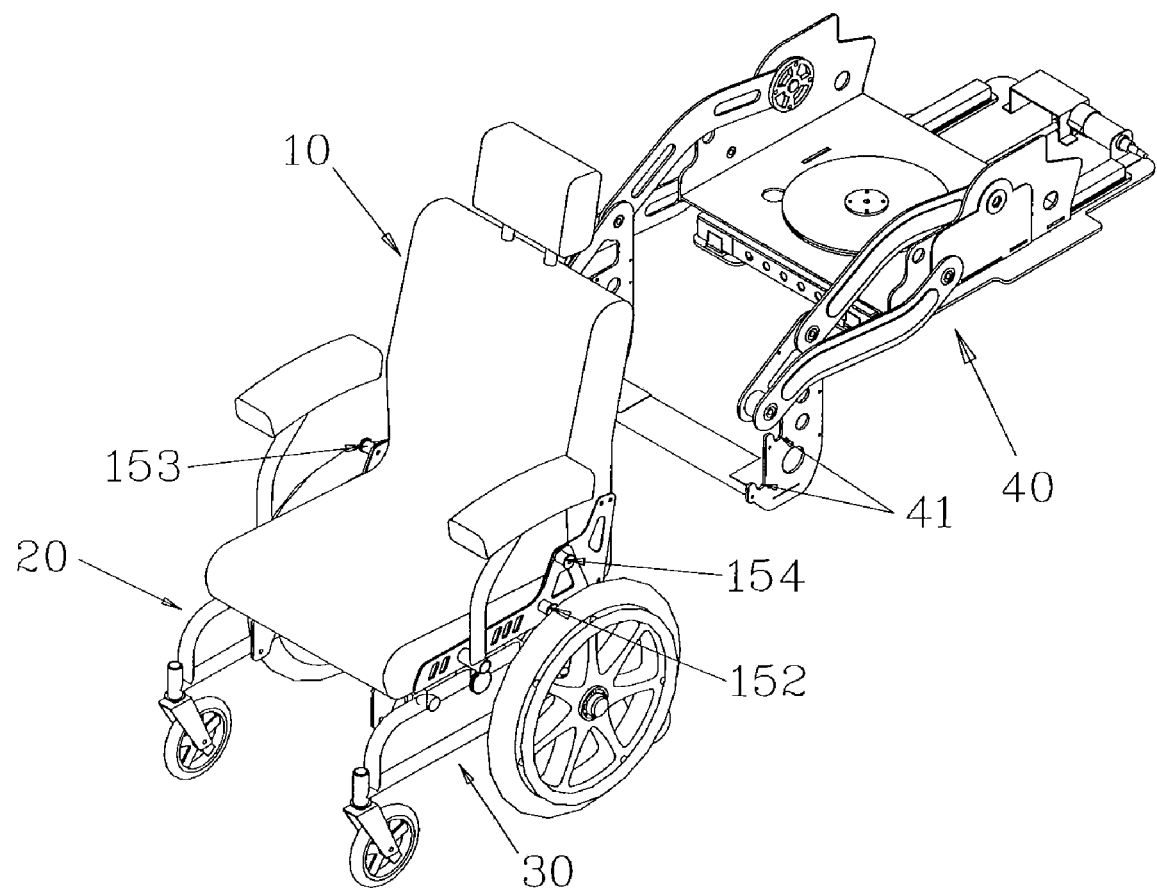
FIG. 6 illustrates a diagram before the assembly of the lifting mechanism and the present invention.
Figure 7:
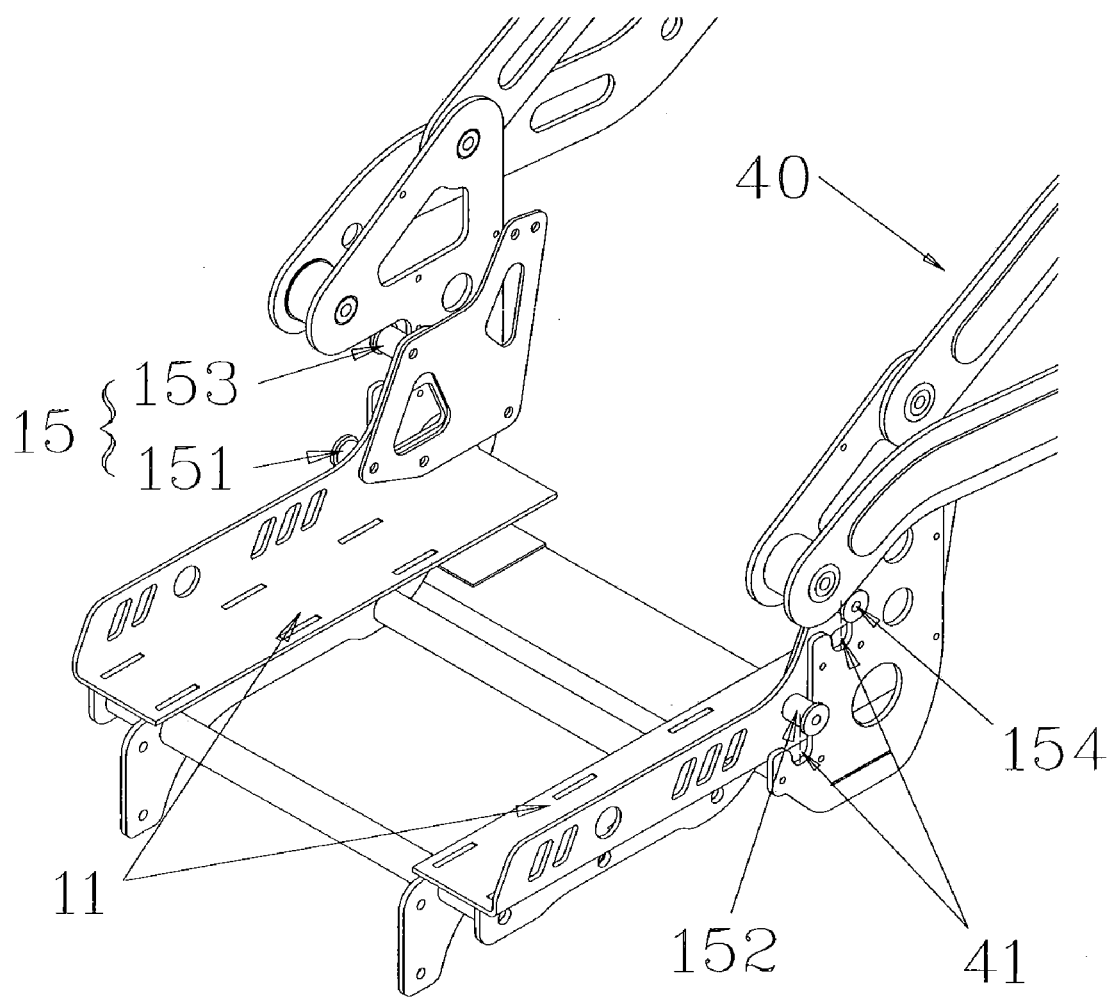
FIG. 7 illustrates an enlarged diagram of detailed configuration relationship of the linkage pins and the linkage recesses.

FIG. 6 to FIG. 9 illustrates an operation diagram of the present invention combined with a specific design of a lifting mechanism of a welfare vehicle. Assumed a lifting mechanism 40 in FIG. 6 is configured to the welfare vehicle, a user can use it to shift the detachable wheelchair of the present invention into the vehicle by means of a lifting function of a four-link link mechanism of the lifting mechanism 40.

More specifically, a plurality of linkage recesses 41 are configured to proper regions of the lifting mechanism 40. These notches are able to cooperate both with the front and the rear linkage pins 151, 153 of the right-hand side of the seat frame 11 and the front and the rear linkage pins 152, 154 of the left-hand side of the seat frame 11. The operation method is to drive the lifting mechanism 40 first and then to make the linkage pins 151, 152, 153, 154 inserted into the corresponding linkage recesses 41. Please refer to an enlarged diagram illustrating detailed configuration relationship thereof in FIG. 7.

Figure 8:
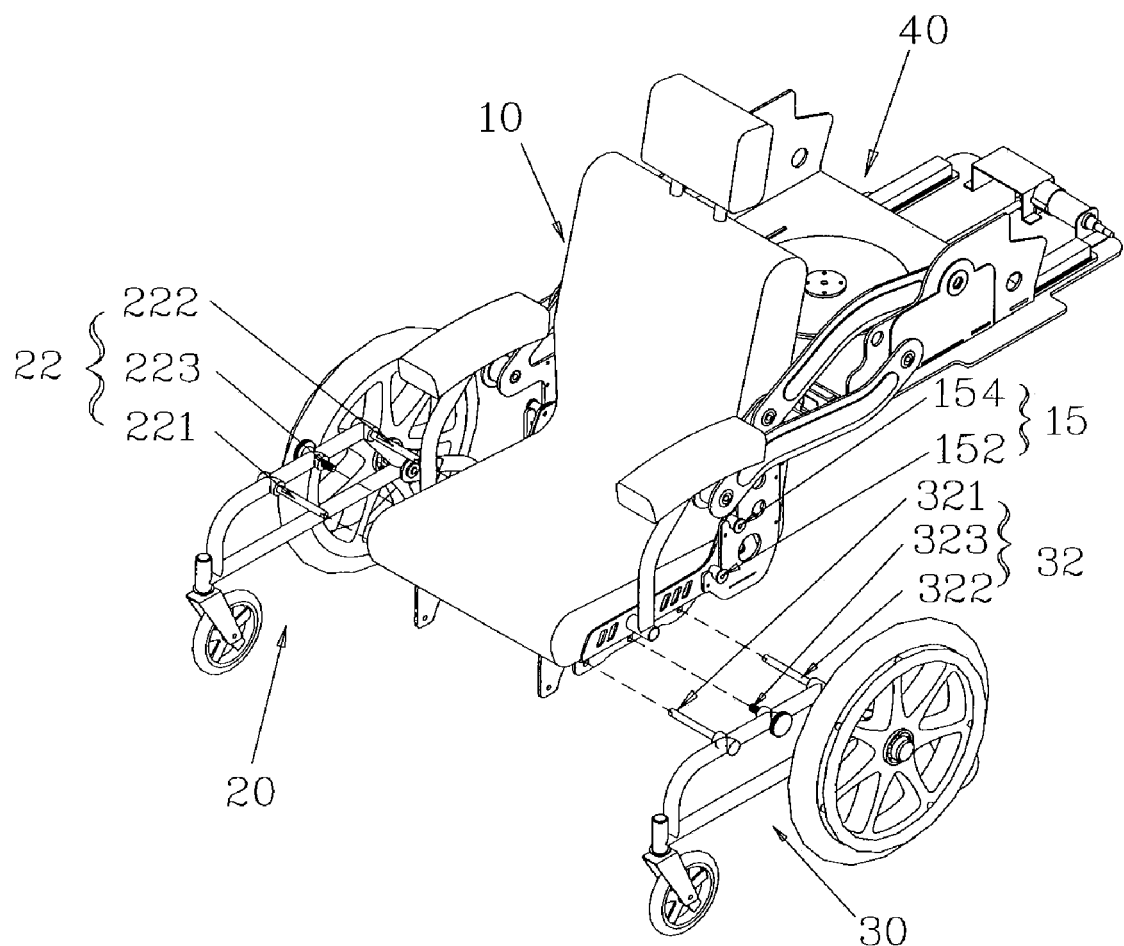
FIG. 8 illustrates a diagram of detaching the wheel frames of the present invention.
Figure 9:
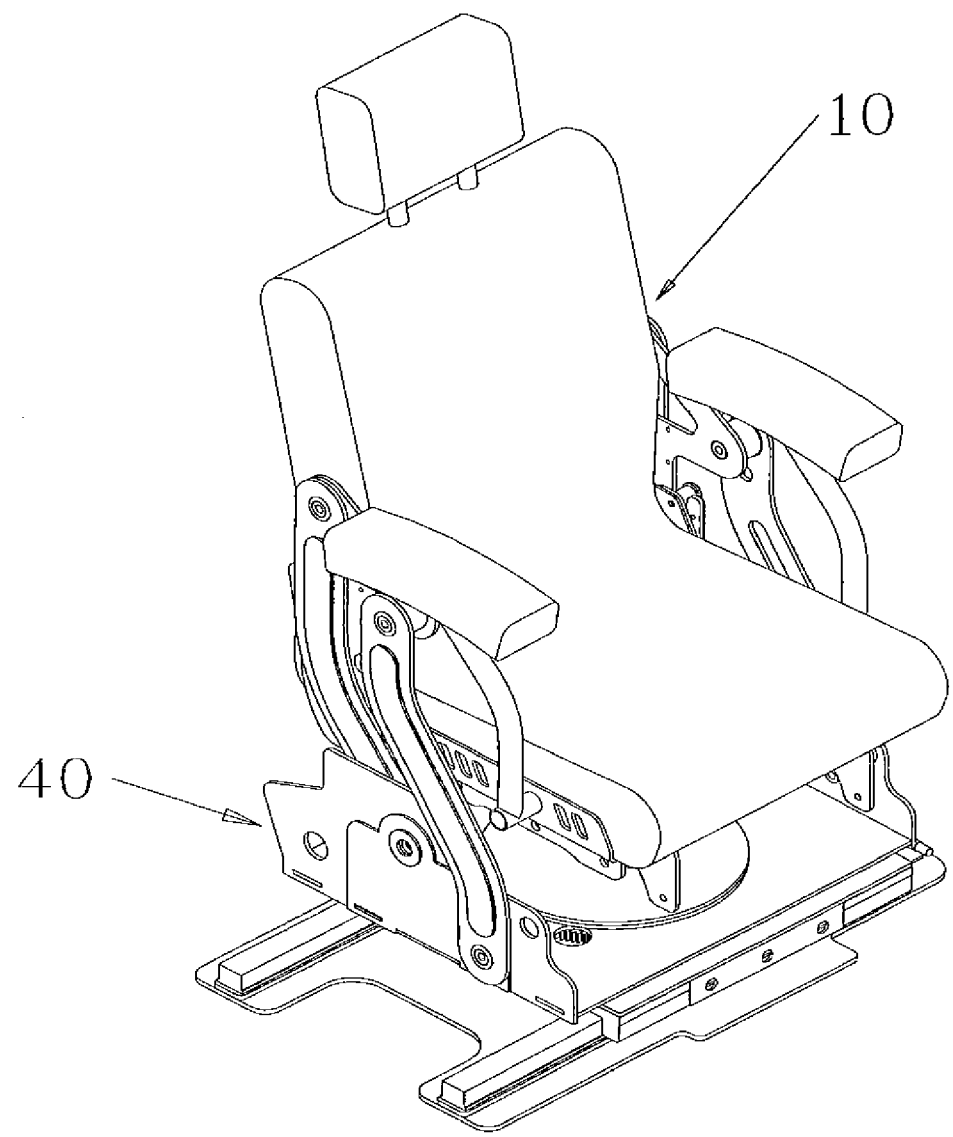
FIG. 9 illustrates a diagram of converting the wheelchair of the present invention into a welfare vehicle seat.

Next, after the lifting mechanism 40 lifts the wheelchair off the ground a little bit, the fixing bolts 223, 323 are able to be loosened from the seat frame 11. By means of the quick detaching function of the present invention, the detached right wheel frame 20 and the detached left wheel frame 30 can be disposed at a proper position in the vehicle as shown in FIG. 8. Next, the lifting mechanism 40 can shift the seat 10 into a vehicle that the wheelchair of the present invention will be used as a seat in a welfare vehicle as illustrated in FIG. 9. On the contrary, as the user removes the seat 10 and the disabled person thereon out of the vehicle, a reverse process of the above mention will be performed to remove the seat 10 out of the vehicle and the right wheel frame 20 and the left wheel frame 30 will be assembled thereto as a wheelchair. Therefore, the disabled person is able to remove out of the vehicle directly that the inconvenience for the transformation between the wheelchair and the seat will be conquered. For the reason that the right wheel frame 20 and the left wheel frame 30 of the present invention are easily detached respectively and disposed at proper positions inside the vehicle, the influence for the space inside the vehicle and the comfort of the passengers therein is substantially small.

Figure 10:
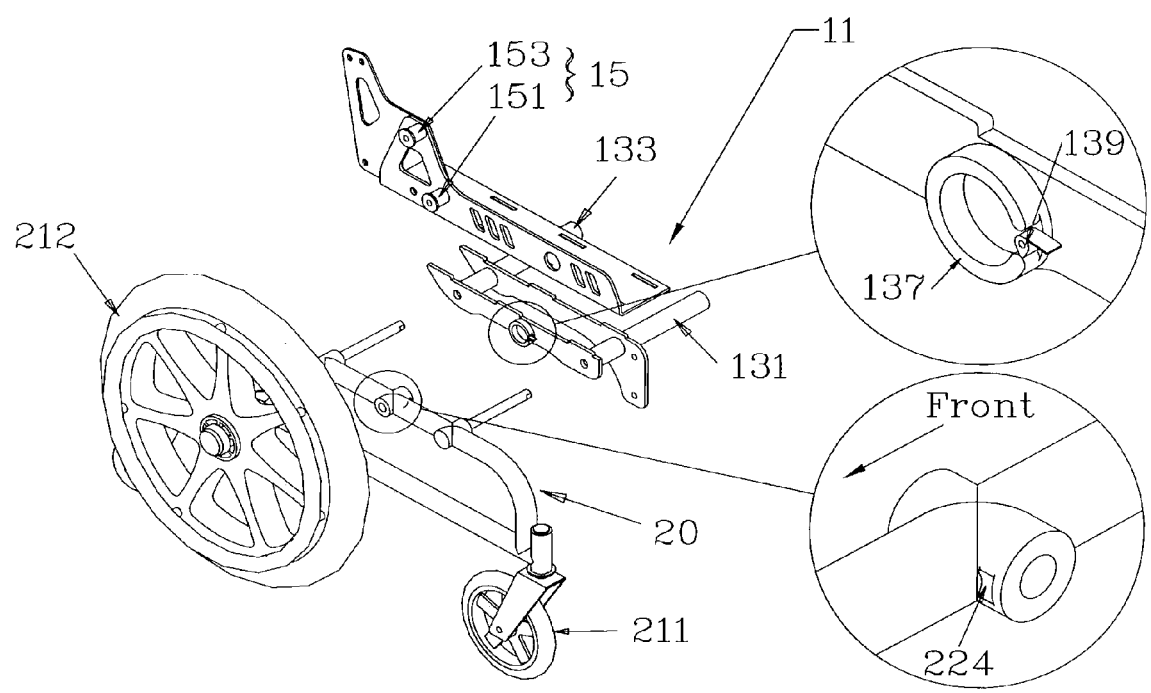
FIG. 10 illustrates a diagram of the configuration of the right fixing sleeve ring and the fixing notch of the present invention.
Figure 11:
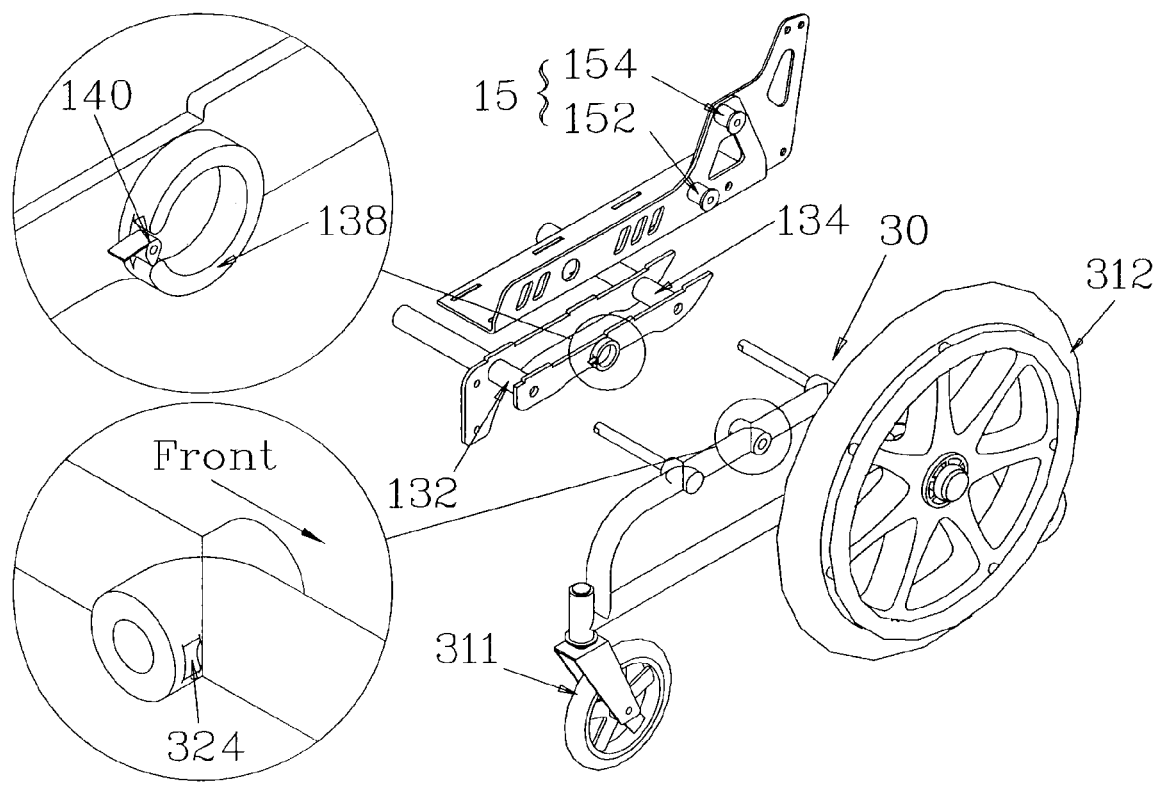
FIG. 11 illustrates a diagram of the configuration of the left fixing sleeve ring and the fixing notch of the present invention.

An embodiment of the present invention is illustrated in FIG. 10. The main structure thereof is similar with the above mention. The difference is that the right fixing nut 135 of the central fixing module 13 of the seat frame 11 can be equivalently replaced by a right fixing sleeve ring 137 and a cam 139 disposed thereon. Consequently, the right fixing bolt 223 of the detachable right fixing module 22 of the right wheel frame 20 can be replaced be a fixing notch 224, matching with the above-mentioned cam 139 in size, at a proper position. Similarly, another embodiment of the present invention is illustrated in FIG. 10. The configuration thereof is the same as the right wheel frame of the above mention. The left fixing nut 136 of the central fixing module 13 can be equivalently replaced by a left fixing sleeve ring 138 and a cam 140 disposed thereon. Consequently, the left fixing bolt 323 of the detachable left fixing module 32 of the left wheel frame 30 can be replaced be a fixing notch 324, matching with the above-mentioned cam 140 in size, at a proper position.

As a fixing procedure of the wheelchair utilizing the fixing sleeve rings 137, 138 and the fixing notches 224, 324 is performed, the front positioning shaft 221 and the rear positioning shaft 222 of the right wheel frame 20 are inserted into the front hollow shaft 131 and the rear hollow shaft 133 of the seat frame 11 respectively. The protruding portion at the upper side of the right wheel frame is also inserted into the right fixing sleeve ring 137 of the seat frame 11, and then, push the right wheel frame 20 inside to make the fixing notch 224 of the right wheel frame 20 can be aligned exactly with the cam 139 of the fixing sleeve ring 137. Next, revolve the cam 139 to make the protruding portion can be wedged into the fixing notch 224 of the right wheel frame 20 that the right wheel frame 20 can be fixed firmly at the right-hand side of the seat frame 11. A similar procedure is performed to fix the left wheel frame 30 to the left-hand side of the seat frame 11. These three portions can be assembled together as a unique wheelchair for the disabled people.

To sum up, the main difference between the detachable wheelchair disclosed by the present invention and the prior art is that the right wheel frame and the left wheel frame of the invention are detachable from the seat frame. After the right and the left wheel frames are detached from the seat, they can be disposed at a proper position inside the vehicle chamber so that more space can be saved for use. Moreover, the detachable wheel frames are made of tubular material which is much lighter but stiffer in strength. Therefore, the wheelchair of the present invention has the advantage of lightness in weight and low cost. The assembly manner of making the fixing bolt, the fixing nut, the hollow shaft, and the positioning shaft modules is also convenient for the wheelchair user to operate independently and reduce the inconvenience which is caused by the necessity of other's assistance.

The above embodiments are used as the examples of the subject invention and used to explain the technical characters of the subject invention and are not used to limit the range of the subject invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A detachable wheelchair, comprising:
   a seat, comprising a seat frame and a seat cushion, wherein said seat cushion is disposed upon said seat frame and said seat frame comprising a central fixing module, said central fixing module comprising two right hollow shafts, one right fixing nut and two left hollow shafts, and one left fixing nut;
   a right wheel frame, comprising a right wheel assembly and a detachable right fixing module, pivoting on said right wheel frame; and
   a left wheel frame, comprising a left wheel assembly and a detachable left fixing module, pivoting on said left wheel frame,
   wherein said detachable right fixing module is able to be fixed to or detachable from the right-hand side of said central fixing module while said detachable left fixing module is able to be fixed to or detachable from the left-hand side of said central fixing module.

2. The detachable wheelchair of claim 1, wherein said detachable right fixing module comprises two right positioning shafts and one right fixing bolt used to be fixed to said two right hollow shafts and said right fixing nut while said detachable left fixing module comprises two left positioning shafts and one left fixing bolt used to be fixed to said two left hollow shafts and said left fixing nut.

3. A seat, able to be assembled into a wheelchair quickly, comprising:
   a seat cushion;
   a seat frame, wherein said seat cushion is disposed upon said seat frame and said seat frame comprising:
   a central fixing module, said central fixing module comprises two right hollow shafts, one right fixing nut and two left hollow shafts, and one left fixing nut; and
   a linkage pin assembly,
   wherein said central fixing module is able to be assembled with a right wheel frame and a left wheel frame in a detachable manner to become said wheelchair, able to be independently operated, and a lifting mechanism is connected to said linkage pin assembly whereby said seat is able to be shifted into a vehicle or to be removed from the vehicle after said right wheel frame and said left wheel frame is detached from said central fixing module.

4. The seat of claim 3, wherein said two right hollow shafts and said right fixing nut of said central fixing module is able to be fixed into two right positioning shafts and one right fixing bolt of said right wheel frame while said left hollow shafts and said left fixing nut of said central fixing module is able to be fixed into two left positioning shafts and one left fixing bolt of said left wheel frame.

* * * * *